May 28, 1957 — E. C. HORTON — 2,793,534
WINDSHIELD CLEANER
Filed March 9, 1954

INVENTOR.
Erwin C. Horton
BY
Beau, Brooks, Buckley & Beau,
ATTORNEYS.

United States Patent Office 2,793,534
Patented May 28, 1957

2,793,534

WINDSHIELD CLEANER

Erwin C. Horton, Hamburg, N. Y., assignor to Trico Products Corporation, Buffalo, N. Y.

Application March 9, 1954, Serial No. 415,045

7 Claims. (Cl. 74—96)

This invention relates to the windshield cleaning art and particularly to windshield cleaner utilizing a cable type of transmission.

The purpose of this invention is to provide the means for equalizing the tension or rigging load throughout the range of travel in a flexible cable drive for outboard windshield wiper shafts, where such shafts are positioned out of line with the drive shaft, thus requiring the cable flight to assume a differentiating degree of alignment between the driver and the driven parts.

Another objective is to provide means of avoiding friction, normally caused by the angular relation of the cable connected driver and driven parts.

A further objective is to eliminate changes in the rigging load where a cylindrical or drum structure is used, irrespective of the position of the cable on the drum in its spiral or corkscrew winding thereon as the cable moves inwardly and outwardly from the anchoring lugs endwise across the periphery of the drum driving members.

Heretofore in flexible cable transmissions designed for the purpose of more quietly transmitting power from a centrally located motor having an auxiliary drive shaft, the auxiliary shaft has been fitted with a crank arm type of transmission. On the ends of the crank arms it has been customary to mount cranks pins for pivotal carriers into which the flexible cable ends have been anchored to move the cable in the back-and-forth motion by the rotation of the carriers pivoted from the crank arm ends. Where such cable flights have been employed it has been customary to provide idle pulleys to guide the flights from their centrally rotated crank pins. These idler pulleys have sometimes been used to lead the flight in turn upwardly and angularly to outboard pivot shaft arm mountings by means of which the oscillation of the blades and arms of the wiper have been accomplished. In such constructions it has been possible to reduce variation due to the rise and fall of the cable ends in their back and forth movement by the centrally positioned lever means and to substantially prevent the end thrust upon the centrally mounted auxiliary drivers.

In the instant design of a cable pull motion translating mechanism, the cable flights are led directly from the driving drums to a pair of rearwardly located driven drum pulleys, one on either side of the car for the mounting of the two individual wiper pivot shafts.

The foregoing and other objects will manifest themselves as this description progresses, reference being made therein to the accompanying drawings, wherein.

Figure 1:
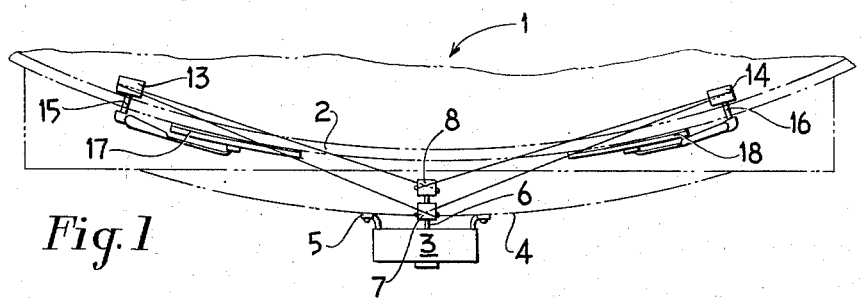
Fig. 1 is a diagrammatic plan view of an automotive windshield cleaning system embodying the instant invention.

Referring now more particularly to the drawings, the numeral 1 generally designates an automotive vehicle having a windshield 2 and wiper motor 3 of the conventional pneumatic pressure type. The motor may be conveniently mounted on the firewall 4 of the vehicle by means of bracket 5. Extending forwardly of the motor is a drive shaft 6 which is oscillated through a predetermined arc by a paddle enclosed within the pressure chamber of the motor as is conventional. A pair of drums 7 and 8 are mounted in tandem on the forward end of the drive shaft and each have extending therefrom a pair of diametrically opposed jaws 9, 9', 10 and 10'. Cables 11, 11', 12 and 12' are connected at one end to the respective jaws and at their opposite ends to drums 13 and 14 mounted on rockshafts 15 and 16 which carry on their inboard ends wipers 17 and 18.

It may be seen that as the drive shaft 6 is oscillated through its predetermined arc by the paddle of the wiper motor the motion will be transmitted to drums 13 and 14 and therefore to wipers 17 and 18 by means of cables 11, 11', 12 and 12'. As a result the wipers will be oscillated across the curved windshield 2 so as to clear precipitation therefrom.

Figure 2:
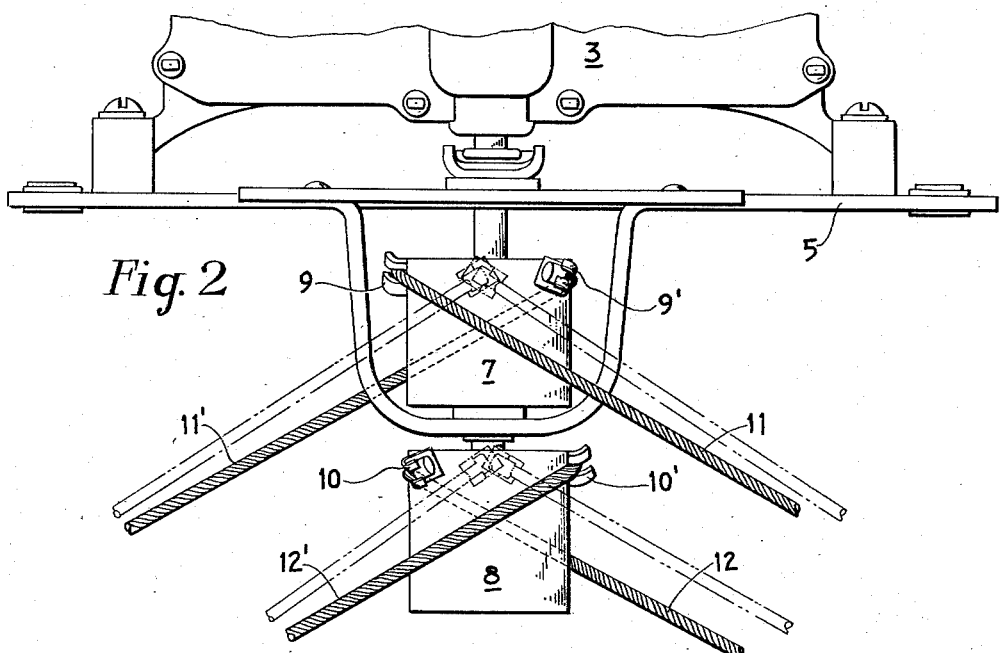
Fig. 2 is a fragmentary plan view to an enlarged scale of the wiper motor and transmission means, illustrating the manner in which the cables are connected to the drum.
Figure 3:
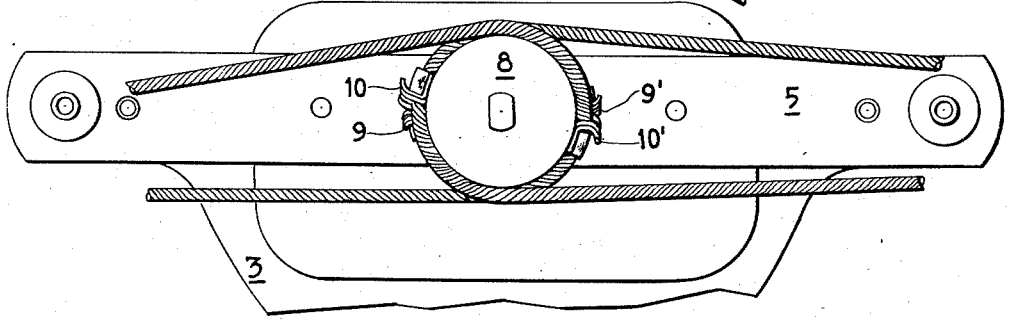
Fig. 3 is a fragmentary front elevational view of the motor, drums and cables.

From an inspection of Figs. 1 and 2 it may be seen that the cables move off drums 7 and 8 at an acute angle to the axis of said drums, whereas heretofore the cables moved off at right angles to such axis, following circumferential guides cut into the drums concentrically with the axis. The employment of such guides is obviously not possible when the cables move off angularly since the angle which the cable makes with the axis of the drums continually changes as the drums oscillate. This is clearly illustrated by a comparison of the solid line and phantom representations in Fig. 2. These two representations indicate the position of the cables with respect to the drum and its axis as the cables rotate through an arc of approximately 90°. Since the wiper drums 13 and 14 are fixed in position and as the jaws 9, 9', 10 and 10' move toward and away from drums 13 and 14 during the cleaning operation the angularity of the cables with respect to the axis constantly changes. It is obvious that guideways need not be employed with the cables.

According to the present invention the drums are constructed with a smooth periphery and the jaws fixed thereto in a position to accommodate the angularity of the cables. With this type of construction the cables are smoothly wrapped about the drums. Since the drums are free of longitudinal obstruction the cables may in an untrammeled manner accommodate themselves without slipping to the angle defined by the axis of the drums 7 and 8 and a line drawn between drums 13 and 14 and the respective jaws to which the cables are attached at their extremities. This accommodation of the cables results in their apparently sliding longitudinally of the drums. However, no sliding takes place since the cables at all times are free to wrap smoothly about the drums in just the position that is determined by the winding angle at the time and place of winding onto the drums, since they remain in the wrapped on position until they are unwrapped and since the angle of pull-off at the time of the unwrap is the same as the angle of approach at the time of winding on. In view of this it should be obvious that guideways on the drums or in conjunction therewith may be employed. However, such guideways of necessity would have to be of spiral configuration and customed tailored to the angularity of the particular installation.

It may therefore be seen that by utilizing drums and a cable transmission constructed in accordance with the instant invention wherein the jaws are fixed so as not to move longitudinally of the drums, there is no requirement that the motor and wipers be located in substantially the same vertical plane, or that the cables be operating substantially at right angles to the rotational axis of the drums. The motor may be located forwardly or rearwardly of the wipers to an extent dictated by and limited by convenience and logistics.

Having thus described an exemplary embodiment thereof what I claim as my invention is:

1. A windshield cleaner comprising, an oscillatory mounting shaft for a wiper, an oscillatory drive shaft, a pair of drums fixed on said drive shaft, and flexible transmission means including cable sections each operatively connected at one end to said wiper mounting shaft and having its opposite end anchored to a respective one of said drums, said cable sections extending at an oblique angle relative to the axis of their respective drums for winding thereonto and unwinding therefrom, one cable section winding while the companion cable section unwinds, and vice versa.

2. A windshield cleaner comprising, an oscillatory mounting shaft for a wiper, an oscillatory drive shaft, a pair of drums fixed on said drive shaft, and flexible transmission means including cable sections each operatively connected at one end to said wiper mounting shaft and having its opposite end anchored to a respective one of said drums for winding thereonto and unwinding therefrom diagonally relative to the axis thereof in an open spiral path, one cable section winding while the companion cable section unwinds, and vice versa, and both drums tapering axially in the same direction.

3. A windshield cleaner comprising, an oscillatory mounting shaft for a wiper, an oscillatory drive shaft, a pair of drums fixed on said drive shaft, and flexible transmission means including cable sections each operatively connected at one end to said wiper mounting shaft and at its opposite end anchored to a respective one of said drums for winding thereonto and unwinding therefrom at an oblique angle relative to the axis thereof in an open spiral path, one cable section winding while the companion cable section unwinds, and vice versa, both of said drums tapering axially in the same direction, and each cable section having its anchored end secured to the larger end of its respective drum.

4. A windshield cleaner for angularly related windshield portions, comprising a power unit including a drive shaft, a wiper mounting shaft, and connecting means for transmitting the operative energy from said drive shaft to said wiper mounting shaft, said connecting means comprising a pair of drums fixed on said drive shaft and a flexible cable means having opposite ends fixed to said wiper mounting shaft and to a respective drum, said cable means extending at an oblique angle to the axis of said drums and the peripheral surfaces of said drums being of sufficient area to wind and unwind said cable means thereon alternately in an open spiral path.

5. A windshield cleaner for angularly related windshield portions, comprising a power unit including a drive shaft, a wiper mounting shaft, and connecting means for transmitting the operative energy from said drive shaft to said wiper mounting shaft, said connecting means comprising a pair of drums fixed on said drive shaft and a flexible cable means having opposite ends fixed to said wiper mounting shaft and to a respective drum, said cable means extending diagonally of said drums and the peripheral surfaces of said drums being of sufficient area to wind and unwind said cable means alternately in an open spiral path, said drive shaft having a bearing support between said drums to support the net side thrust pressure from said flexible cable means on opposite sides of said bearing, and means for attaching the ends of said cable means to said drums for such spiral winding and unwinding thereon.

6. In a cable drive wiper system for curved windshields, remotely located wiper pivot shafts, a drive shaft, winding drum means axially mounted on said drive shaft and having smooth cylindrical surface portions, a pair of cables operatively connecting said drum means to said pivot shafts, anchoring means securing said cables on said drum means with the former extending at an oblique angle to the axis of the latter, said smooth cylindrical surface portions providing winding areas for the spiral winding of said cables to use the lateral thrust of one cable as an offset for the lateral thrust of the companion cable.

7. In a cable drive wiper system for curved windshields, remotely located wiper pivot shafts, a drive shaft, a winding drum means axially mounted on said drive shaft and having smooth cylindrical surface portions, a pair of cables operatively connecting said drum means to said pivot shafts, anchoring means for securing said cables on said drum means with the former extending diagonally of the latter, said smooth cylindrical surface portions providing winding areas for the spiral winding of said cables to use the lateral thrust of one cable as an offset for the lateral thrust of the companion cable, said smooth-faced drum means having longitudinally spaced, tapering winding areas, said cables taking from one winding area and about the respective pivot shaft and back onto the companion winding area, the arrangement being to provide give and take changes in its circumference to compensate for the increasing and decreasing spiral distances around said drum means.

References Cited in the file of this patent

UNITED STATES PATENTS

| 23,676 | Goolman | Apr. 19, 1859 |
| 362,304 | Metzger | May 3, 1887 |
| 1,495,875 | Bergaus | May 27, 1924 |
| 2,212,823 | Bulk | Aug. 27, 1940 |
| 2,617,315 | McClelland | Nov. 11, 1952 |
| 2,660,894 | McClelland | Dec. 1, 1953 |

FOREIGN PATENTS

| 329,690 | Germany | Nov. 27, 1920 |